Jan. 6, 1925.
W. J. BAILEY
AUTOMATIC FENDER FOR AUTOMOBILES
Filed Aug. 9, 1924   2 Sheets-Sheet 1
1,521,666
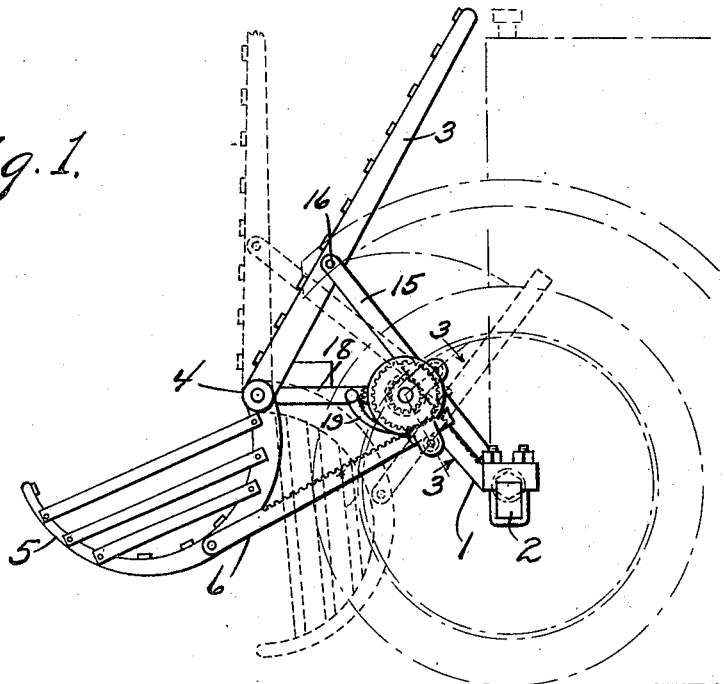
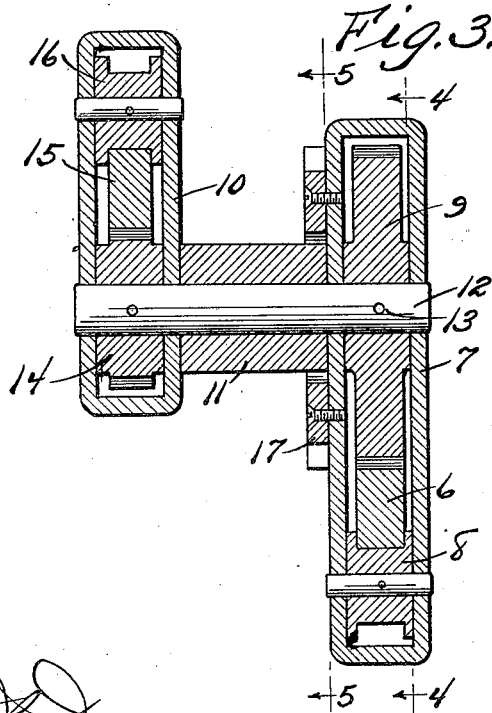
W. J. Bailey, INVENTOR
BY Victor J. Evans, ATTORNEY Jan. 6, 1925. 1,521,666
W. J. BAILEY
AUTOMATIC FENDER FOR AUTOMOBILES
Filed Aug. 9, 1924   2 Sheets-Sheet 2
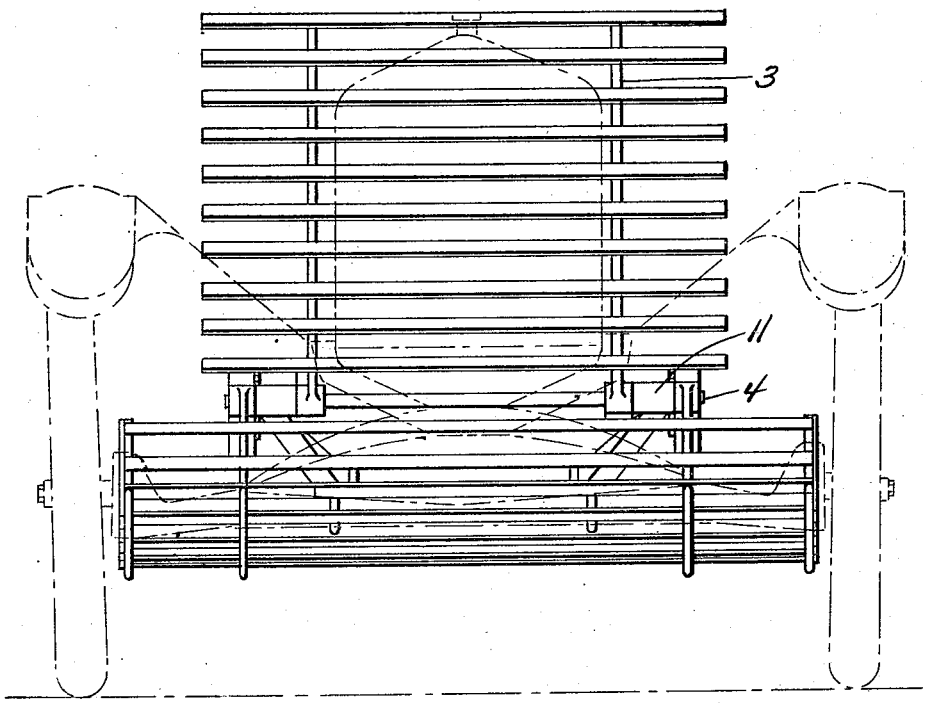
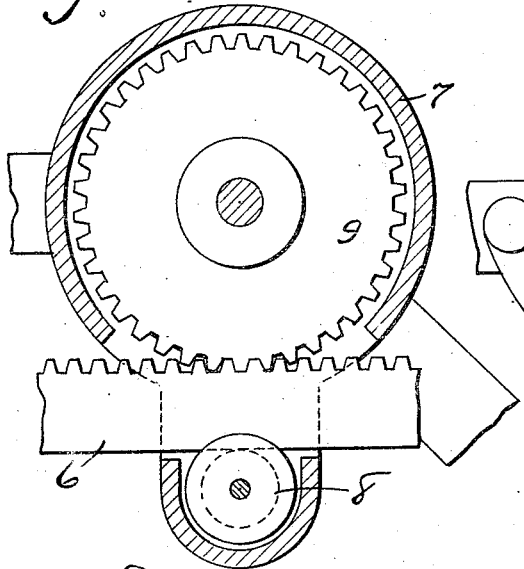
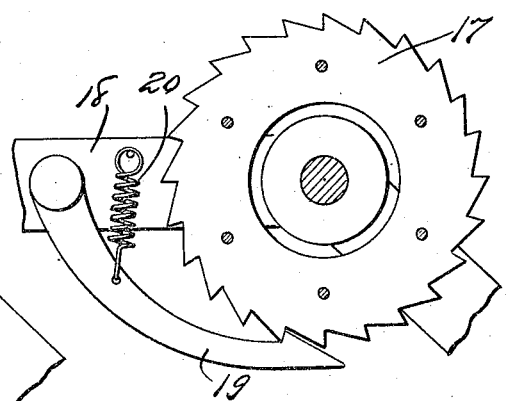
W. J. Bailey
INVENTOR Patented Jan. 6, 1925.

1,521,666

UNITED STATES PATENT OFFICE.

WILLIAM J. BAILEY, OF BEAUMONT, TEXAS.

AUTOMATIC FENDER FOR AUTOMOBILES.

Application filed August 9, 1924. Serial No. 731,139.

*To all whom it may concern:*

Be it known that I, WILLIAM J. BAILEY, a citizen of the United States, residing at Beaumont, in the county of Jefferson and State of Texas, have invented new and useful Improvements in Automatic Fenders for Automobiles, of which the following is a specification.

My present invention pertains to fenders designed to pick up persons caught in the path of vehicles; and it has for its general object to provide an automatic fender designed more particularly for use on automobiles and calculated when it encounters a person in the path of an automobile to automatically raise such person from the ground and avert or lessen the injury inflicted on such person.

Another object of the invention is the provision of a fender for the purpose indicated that is simple, compact and durable in construction, and is reliable in operation.

Another object is the provision of a fender of such construction that it will not detract from the finished appearance of an automobile.

To the attainment of the foregoing, the invention consists in the improvement as hereinafter described and definitely claimed.

In the accompanying drawings, forming part of this specification:—

Figure 1 is a side elevation illustrating a portion of an automobile equipped with my novel fender, the fender being shown by dotted lines in its normal state and by full lines in the state it assumes when a person is encountered in the path of the automobile.

Figure 2 is a front elevation of the same.

Figure 3 is an enlarged detail cross-section taken on the line 3—3 of Figure 1.

Figures 4 and 5 are detail sections taken in the planes indicated by the lines 4—4 and 5—5, respectively, of Figure 3.

Similar numerals of reference designate corresponding parts in all of the views of the drawings.

My improvement is carried by bracket arms 1 appropriately fixed to the front axle 2 of an automobile, and among other elements the improvement comprises a swinging fender section 3, pivotally connected at 4, and a basket-like fender section 5 having the same center of movement as the section 3 and appropriately connected in pivotal manner at the points 4. The section 5 is designed to receive and carry clear of the ground the body of a person encountered in the path of the automobile, and it will be noted that the said section 5 is provided with pivotally connected rearwardly extending rack bars 6. These rack bars 6 of which two are preferably employed, are carried rearwardly through appropriately fixed and supported housings 7, one of which is shown in Figures 3 and 4. Each of the said housings 7 is provided at 8 with a circumferentially grooved anti-friction roller for guiding and easing the movement of the rack bar 6 engaged thereby. Also arranged in the housing 7 is a spur gear 9 in mesh with the rack bar 6.

Spaced inwardly from the housings 7 are housings 10, spacing sleeves 11 being interposed between the housings as clearly shown in Figure 2. The housings 10 as well as the housings 7 are appropriately fixed to the brackets 1 and extending through the said housings 7 and 10 and also through the spacing sleeves 11 are short shafts 12 to which the gears 9 are fixed at 13. Also fixed to the shafts 12 and arranged in the housings 10 are spur gears 14, the said spur gears 14 being meshed with rack bars 15 pivotally connected at 16 to the fender section 3. It will also be noted that in the housings 10 are circumferentially guide and anti-friction rollers 16 in engagement with the rack bars 15 as illustrated. The fixed casings 7 are provided at their inner sides with ratchet annuli 17, and connected to the fender section 3 are rearwardly extending swinging arms 18 to which are pivotally connected dogs 19, influenced by retractile springs 20, Figures 1 and 5. In virtue of this construction it will be noted that when the section 3 is swung backwardly and the section 5 is raised, the dogs 19 in cooperation with the ratchet annuli 17 will maintain the section 5 in raised position so as to carry the person picked up in the said section 5 clear of the ground with a view to averting serious injury to the person. Manifestly when the sections 3 and 5 are to be restored to the normal state, the dogs 19 are manually disengaged from the annuli 17 so as to permit of movement of the sections 3 and 5 to the dotted line positions shown in Figure 1.

My novel fender is designed more particularly for saving children caught in front of an automobile; and it will be manifest that when the section 3 is forced backwardly by the body of the child the section 5 will be swung upwardly so as to catch the body of the child and prevent the same from getting beneath the wheels of the automobile; also, that the child will be carried safely and inasmuch as to avert the violent striking of its head against the pavement or roadway.

I have specifically described the preferred embodiment of my invention in order to impart an exact understanding of the said embodiment. I do not desire, however, to be understood as confining myself to the specific construction and relative arrangement of parts as disclosed inasmuch as the scope of my invention is defined by my appended claims within which changes or modifications may be made without departure from my invention.

Having described my invention, what I claim and desire to secure by Letters-Patent, is:—

1. A vehicle fender comprising a basket-like swinging section, a second swinging section adapted to receive the impact of the body encountered by the fender, appropriately supported gears arranged in rear of said sections and fixed with respect to each other, a rack bar connected with the first of said sections and meshed with one of said gears, a rack bar connected with the other of said sections and meshed with the other gear, and means for retaining the sections in the positions to which they are moved by the action of the body against the second named section.

2. A vehicle fender comprising a basket-like swinging section, a second swinging section adapted to receive the impact of the body encountered by the fender, appropriately supported gears arranged in rear of said sections and fixed with respect to each other, a rack bar connected with the first of said sections and meshed with one of said gears, a rack bar connected with the other of said sections and meshed with the other gear, an appropriately supported ratchet, an arm fixed to one of the first-named sections, a pawl connected to said arm and arranged to engage said ratchet, and means for yieldingly maintaining the pawl in engagement with the ratchet.

3. An automobile fender comprising casing means fixed on the front axle of an automobile, a pivoted basket-like section connected with said axle, a pivoted section adapted to be moved rearwardly by contact with the body of a person, casing means fixed with respect to the axle and enclosing said gears, anti-friction rollers in the said casing means and spaced from the gears, rack bars connected to the first of said sections and meshed with certain of said gears, rack bars connected to the second-named section and meshed with other of said gears, ratchet means fixed to the casing means, and arms fixed to one of the first-named sections and carrying means for cooperating with the ratchet means to maintain the first-named sections in the positions to which the same are automatically moved.

In testimony whereof I affix my signature.

WILLIAM J. BAILEY.